(12) United States Patent
Takai et al.

(10) Patent No.: US 8,792,599 B2
(45) Date of Patent: Jul. 29, 2014

(54) DIVERSITY RECEPTION DEVICE

(75) Inventors: Hitoshi Takai, Osaka (JP); Masaki Yamaguchi, Osaka (JP); Makoto Sekitoh, Osaka (JP)

(73) Assignee: Panasonic Corporation, Kadoma-shi (JP)

(*) Notice: Subject to any disclaimer, the term of this patent is extended or adjusted under 35 U.S.C. 154(b) by 0 days.

(21) Appl. No.: 13/593,539

(22) Filed: Aug. 24, 2012

(65) Prior Publication Data

US 2012/0320962 A1 Dec. 20, 2012

Related U.S. Application Data

(63) Continuation of application No. PCT/JP2011/001035, filed on Feb. 23, 2011.

(30) Foreign Application Priority Data

Feb. 24, 2010 (JP) ................................. 2010-038339
Mar. 23, 2010 (JP) ................................. 2010-066040

(51) Int. Cl.
*H04B 7/10* (2006.01)
*H04L 1/02* (2006.01)

(52) U.S. Cl.
USPC ........................................................ 375/347

(58) Field of Classification Search
CPC ..... G01S 19/09; H01Q 1/246; H04B 17/0061
See application file for complete search history.

(56) References Cited

U.S. PATENT DOCUMENTS 5,561,673 A * 10/1996 Takai et al. .................... 714/708
6,067,449 A 5/2000 Jager 2006/0025090 A1 2/2006 Shirakata et al.
2009/0063911 A1 * 3/2009 Tsukio et al. ................. 714/708

FOREIGN PATENT DOCUMENTS

| JP | H09-331312 A | 12/1997 |
| JP | 2003-143100 A | 5/2003 |
| JP | 2003-283405 A | 10/2003 |
| JP | 2005-518760 A | 6/2005 |
| JP | 2005-223510 A | 8/2005 |
| JP | 2005-318104 A | 11/2005 |
| JP | 2005-348235 A | 12/2005 |
| JP | 2006-033056 A | 2/2006 |
| JP | 2006-311258 A | 11/2006 |
| JP | 2006-319608 A | 11/2006 |
| JP | 2007-208658 | 8/2007 |
| JP | 2007-274726 A | 10/2007 |
| JP | 2008-079203 A | 4/2008 |
| JP | 2009-164708 A | 7/2009 |
| JP | 2010-130036 A | 6/2010 |

* cited by examiner

*Primary Examiner* — Chieh M Fan
*Assistant Examiner* — Wednel Cadeau
(74) *Attorney, Agent, or Firm* — Judge Patent Associates

(57) ABSTRACT

The diversity reception device includes an antenna switching unit configured to select and switch to a determined chain number of antennas out of a plurality of antennas; and an antenna interchange control unit configured to control the antenna switching unit to interchange an antenna. The antenna interchange control unit compares a carrier-to-noise ratio measured by a demodulation circuit of a demodulation unit of each chain, controls the antenna switching unit to sequentially switch connection with an antenna of a chain having a lowest carrier-to-noise ratio to connection with antennas connectable to the chain, and interchanges the antenna of the chain having a lowest carrier-to-noise ratio with an antenna estimated to have a highest carrier-to-noise ratio on the basis of the input level measured by the level detection unit or an antenna having a highest input level measured by the level detection unit among the connection-switched antennas.

19 Claims, 13 Drawing Sheets

DIVERSITY RECEPTION DEVICE

TECHNICAL FIELD

The present disclosure relates to diversity reception devices that receive digital television broadcasts with a plurality of antennas.

BACKGROUND ART

In the vehicle onboard reception, as well as in the indoor reception, of digital television (DTV) broadcast waves, multipath propagation generated by diffraction, scattering, and reflection of surrounding objects such as buildings gives rise to locally significant decline in signal intensity (fading), and entails significant waveform distortion, in the received signals, such that stabilized receiving of signals is problematic. For reception in such an environment, diversity reception using a plurality of receiving antennas is effective and thus put into practical use. A generally performed technique for diversity combining is maximal ratio combining, in which combining is carried out by matching the phases of the respective signals received at each antenna and at the same time weighting the received signals by carrier-to-noise ratio (CNR). Maximal ratio combining positively improves the post-combined CNR of the signals. In particular, with DTV schemes that adopt orthogonal frequency-division multiplexing (OFDM), carrying out maximal ratio combining on a per-subcarrier basis yields frequency diversity effects, wherein considerably ameliorative effects are obtained. The reception quality is improved, and the extent of the area over which reception is possible is improved, in accordance with the number of diversity branches.

Meanwhile, an alternative for improving the reception quality and extending the signal-receivable area is the idea to use an antenna having directivity. The use of directional antennas improves the multipath reception state by limiting the directions along which received signals arrive, and thus is promising for reducing fading. In addition, Doppler spread during high-speed movement is suppressed, wherein with OFDM schemes, which tend to suffer from inter-carrier interference, combining diversity reception and directional antennas is advantageous. However, unlike the situation with stationary reception, the directions in which the received waves arrive are diverse, such that in general it is necessary to prepare numerous antennas having directivity in differing directions, which requires switching and selecting among the numerous antennas to employ them, or requires conjunction with diversity reception such as described above and combining signals to receive them.

FIG. 9 is a block diagram showing the configuration of a diversity reception device of a first conventional example. In the diversity reception device of the first conventional example shown in FIG. 9, in vehicle onboard reception of DTV broadcast waves, a method for improving the quality of reception by using a plurality of antennas having directivity and using switching selection and combining in conjunction is proposed (e.g., see Patent Literature 1).

In FIG. 9, the diversity reception device of the first conventional example comprises front-beam antennas 5101 and 5201, rear-beam antennas 5102 and 5202, an antenna switch 5111, tuner units 5171 and 5271, gain control units 5135 and 5235, OFDM demodulation units 5145 and 5245, level detection units 5142 and 5242, a diversity combining unit 5303, an error correction unit 5304, and an antenna control unit 5301.

The antenna switch 5111 selects either the front-beam antenna 5101 having directional characteristics in the forward direction of a vehicle or the rear-beam antenna 5102 having directional characteristics in the backward direction of the vehicle, and selects either the front-beam antenna 5201 or the rear-beam antenna 5202. Received signals from the selected beam antennas are demodulated by the OFDM demodulation units 5145 and 5245 via the tuner units 5171 and 5271, respectively, then combined by the diversity combining unit 5303, subjected to error correction by the error correction unit 5304, and outputted as a transport stream (TS).

In the OFDM demodulation units 5145 and 5245, the respective outputs of the level detection units 5142 and 5242 are used: to control the gain of the tuner units 5171 and 5271 via the gain control units 5135 and 5235 to keep appropriate input levels of the OFDM demodulation units 5145 and 5245; and as received power information for determination information for antenna switching selection at the antenna control unit 5301. In addition, error rate information at the error correction unit 5304 is also used for the determination information for the antenna switching selection at the antenna control unit 5301.

FIG. 10 is a flowchart showing a procedure of the antenna switching selection at the antenna control unit 5301 in the diversity reception device of the first conventional example. In selecting the antenna having directional characteristics in the forward direction or the backward direction, the tuner unit 5171 or 5271, the OFDM demodulation unit 5145 or 5245, or the like is shared in the diversity reception device of the first conventional example. In addition, also due to restrictions of the response time of the gain control unit 5235 and the like, it is necessary to detect an average reception level over a time of about several hundred milliseconds. Thus, in order to check the reception state in each direction, the antennas cannot be switched indiscriminately.

Thus, first, the antenna control unit 5301 observes a reception error rate. When determining that the reception error rate exceeds a criterion and the reception state has worsened (i.e., when a switching start condition is met), the antenna control unit 5301 enters a sequence of the antenna switching selection (step S6001). Specifically, when the switching start condition is met at step S6001, the antenna control unit 5301 detects the average reception level of the front-beam antenna 5101 or 5201 over a period of several hundred milliseconds (step S6002). Then, the antenna control unit 5301 switches the antenna switch 5111 and detects the average reception level of the rear-beam antenna 5102 or 5202 over a period of several hundred milliseconds (step S6003). Then, the antenna control unit 5301 compares both average reception levels (step S6004), switches to the antenna having a higher level and keeps this switching state for several seconds to several ten seconds (step S6005), and returns to the determination of the switching start condition (step S6001).

According to this configuration and procedure, in the diversity reception device of the first conventional example, it is proposed to use the switching selection and signal combining in conjunction, whereby while increase in the chain number of cost-elevating later-stage tuner units and OFDM demodulation units is held down, the antennas are lent directivity, and the number of antennas is increased, which serves to improve the performance.

For example, in the diversity reception device of the first conventional example, a control procedure with improved antenna switching selection at the antenna control unit 5301 is proposed. FIG. 11 is a flowchart showing the control procedure with improved antenna switching selection at the antenna control unit 5301 in the diversity reception device of the first conventional example.

Similarly to the procedure in FIG. 10, since, in order to check the reception state in each direction, the antennas cannot be switched indiscriminately, the antenna control unit 5301 initially observes a reception error rate, and when determining that the reception error rate exceeds a criterion and the reception state has worsened (i.e., when a switching start condition is met), the antenna control unit 5301 enters a sequence of the antenna switching selection (step S7001). Specifically, when the switching start condition is met at step S7001, the antenna control unit 5301 detects the average reception level of the front-beam antenna 5101 (or 5201) over a period of several hundred milliseconds (step S7002). Then, the antenna control unit 5301 switches the antenna switch 5111 and detects the average reception level of the rear-beam antenna 5102 (or 5202) over a period of several hundred milliseconds (step S7003). Then, the antenna control unit 5301 compares both average reception levels, switches to the antenna having a higher average reception level among the front-beam antenna 5101 (or 5201) and the rear-beam antenna 5102 (or 5202) (step S7004), and waits for a given period of time (step S7005).

The control procedure shown in FIG. 11 differs from the procedure in FIG. 10 in that, with regard to antenna switching selection for another chain, switching selection is performed without actual measurement of an average reception level. In other words, at step S7004, when the front-beam antenna 5101 (or 5201) is selected, the antenna control unit 5301 performs switching selection of the front-beam antenna 5201 (or 5101) in the other chain as well, and when the rear-beam antenna 5102 (or 5202) is selected, the antenna control unit 5301 performs switching selection of the rear-beam antenna 5202 (or 5102) in the other chain as well (step S7006). Then, the antenna control unit 5301 waits for a given period of time (step S7007) and returns to the determination of the switching start condition (step S7001).

In addition, in the control procedure shown in FIG. 11, the idea is disclosed that the average reception level detection in the other chain is omitted to reduce deterioration of reception during switching and average reception level measurement. FIG. 12 is a block diagram showing the configuration of a diversity reception device of a second conventional example. In the diversity reception device of the second conventional example shown in FIG. 12, a method for improving the quality of reception by using a plurality of antennas having directivity and using switching selection and combining in conjunction for vehicle onboard reception of DTV broadcast waves is proposed similarly to the first conventional example. Furthermore, in the second conventional example, the idea to previously combine signals from a plurality of antennas to make a single diversity branch is also disclosed in addition to simple antenna switching. In addition, the idea to use, as a switching start condition, a reception level or a CNR or use a change of a travelling direction or a speed with a steering angle sensor or a gyro sensor is also disclosed (e.g., see Patent Literature 2).

In FIG. 12, the diversity reception device of the second conventional example comprises front-beam antennas 8101 and 8201, rear-beam antennas 8102 and 8202, an antenna switch 8111, tuner units 8171 and 8271, OFDM demodulation units 8145 and 8245, a diversity combining unit 8303, an error correction unit 8304, a TS decode circuit 8311, an antenna control unit 8301, a steering angle sensor 8312, and a gyro sensor 8313.

The antenna switch 8111 selects either the front-beam antenna 8101 having directional characteristics in the forward direction of a vehicle or the rear-beam antenna 8102 having directional characteristics in the backward direction of the vehicle, and selects either the front-beam antenna 8201 or the rear-beam antenna 8202. The difference from the first conventional example is that the front-beam antenna 8101 and the rear-beam antenna 8102 or the front-beam antenna 8201 and the rear-beam antenna 8202 can be combined to perform output. Then, received signals at the respective chains are demodulated by the OFDM demodulation units 8145 and 8245 via the tuner units 8171 and 8271, respectively, combined by the diversity combining unit 8303, and subjected to error correction by the error correction unit 8304, and information of images and sounds are taken out therefrom by the TS decode circuit 8311. For determination information for antenna switching selection, the antenna control unit 8301 uses not only received power information and error information similarly to the first conventional example, but also a CNR and a channel estimation result.

FIG. 13 is a flowchart showing a control procedure of the antenna switching selection at the antenna control unit 8301 in the diversity reception device of the second conventional example. Similarly to the first conventional example, in switching selection of directional antennas, in order to check the reception state in each direction, the antennas cannot be switched indiscriminately. Thus, in the conventional example as well, after it is determined that the reception state has worsened, a sequence of the antenna switching selection is entered (step S9001). In other words, the idea to set a switching start condition is in common. However, the idea is also disclosed that, as a switching start condition, a determination is performed when the received power or CNR at each of all diversity branches is less than a determined threshold, or a change of a travelling direction and a speed are used with the steering angle sensor and the gyro sensor (step S9002).

With regard to antenna switching selection after the switching start condition is met, when the received power is less than a threshold at step S9002, the front-beam antenna 8101 and the rear-beam antenna 8102 or the front-beam antenna 8201 and the rear-beam antenna 8202 are combined to perform output and are used as a diversity branch (step S9003). The idea is also disclosed that, similarly to the first conventional example, when the received power is not less than the threshold at step S9002, the antenna switch 8111 is switched, a CNR or a transmission path estimated value is detected, an antenna having a higher CNR or a less variation of the channel estimation determined as an antenna having a better quality of reception, and switching selection is performed (step S9004).

Furthermore, reception level is used, but with reception level, unlike CNR, accurate determination cannot be performed in the case of occurrence of variation in the gain of a tuner unit or the like, in a multipath, or in a Doppler environment. Thus, the idea is also disclosed that the relationship between a reception level and a CNR is previously measured and evaluated and is retained in the form of a table and conversion is performed with the table.

CITATION LIST

Patent Literature

[PTL 1] Japanese Laid-Open Patent Publication No. 2007-274726
[PTL 2] Japanese Laid-Open Patent Publication No. 2006-033056

SUMMARY OF THE INVENTION

Problems to be Solved by the Invention

However, in the configurations and control procedures in the conventional diversity reception devices described above, the antennas are switched over a significant period of time, and in order to evaluate the reception state on the basis of the average reception level, the CNR, the channel estimation result, or the like, switching selection of antennas cannot be indiscriminately performed. Thus, it is necessary to perform a procedure for avoiding deterioration at frequent switching selection, such as setting of a start condition or insertion of a waiting time. Therefore, in the conventional diversity reception devices, a superior effect of improving the quality of reception with respect to the increase in the number of antennas is not obtained as compared to the case where all antennas are subjected to diversity combining. In particular, with regard to a use for vehicle onboard reception, in the case of a film antenna attached to a windshield or the like, the directivity pattern is often complicated due to restrictions in planar structure and the influence of the vehicle body or the like, wherein the reception state at each antenna greatly changes with respect to change of the relationship between the arrival direction and the travelling direction as compared to an antenna having proper directivity. Unless switching selection is frequently performed, considerable improvement of the quality of reception cannot be obtained.

In addition, in the case of a film antenna, low-noise amplifiers disposed in front are attached to the windshield or the like similarly to the film antenna. Since the gains change based on temperature and an optional combination in length of coaxial cables is used to connect the low-noise amplifiers and a separated reception device, it is actually difficult to previously evaluate and define variations of the gain and cable losses, and retain a conversion table in the reception device. Furthermore, external noise from a neighboring electronic device such as a personal computer is relatively great in indoor reception and noise coming from an electrical component mounted in a vehicle is relatively great in vehicle onboard reception. In addition, the influence from another wireless system or the like or environmental noise as ambient noise in an urban area is great. Thus, it is a major challenge to be able to simultaneously and accurately perform switching selections even frequently, so as to adapt to the external noise environment for achieving really favorable reception state improvement.

Therefore, the present disclosure has been made to solve the conventional problems described above, and an object of the present disclosure is to be able to perform, in a shorter time, antenna switching selection which is applicable to an antenna that does not have particular directivity, and which causes less deterioration. In addition, another object of the present disclosure is to provide a diversity reception device that can accurately perform switching selection, despite external noise or variations in preamplifier gain, thereby having better performance while holding down cost increases.

Solution to the Problems

In order to solve the conventional problems described above, a diversity reception device of the present disclosure includes: a plurality of antennas configured to receive digital broadcast waves; an antenna switching unit configured to select and switch to a determined chain number of antennas out of the plurality of antennas; the determined chain number of tuner units and the determined chain number of demodulation units configured to receive respective input of received signals of the determined chain number of antennas selected by the antenna switching unit; a diversity combining unit configured to perform diversity combining on outputs of the determined chain number of demodulation units; and an antenna interchange control unit configured to control the antenna switching unit to interchange an antenna. Each of the demodulation units includes a demodulation circuit configured to measure a carrier-to-noise ratio of its received signal in the process of demodulating and a level detection unit configured to measure an input level of its received signal. Each of the tuner units includes a gain control unit configured to control gain in its received signal. The antenna interchange control unit: compares the carrier-to-noise ratio measured by the demodulation circuit of each chain and, for the chain having a lowest carrier-to-noise ratio, controls the antenna switching unit to sequentially switch connection with an antenna of the chain to connection with antennas connectable to said chain; and interchanges the antenna of the chain having the lowest carrier-to-noise ratio with an antenna estimated to have a highest carrier-to-noise ratio on the basis of the input level measured by the level detection unit or an antenna having a highest input level measured by the level detection unit among the connection-switched antennas.

By this configuration, an antenna of a chain having a lowest carrier-to-noise ratio can be switched to an antenna having a highest carrier-to-noise ratio or a best input level, in a short time.

Advantageous Effects of the Invention

According to the diversity reception device of the present disclosure, antenna switching selection causing less deterioration can be performed in a shorter time. In addition, a diversity reception device can be provided which can accurately perform switching selection, despite external noise or inconsistencies in preamplifier gain, thereby having better performance while holding down cost increases.

DESCRIPTION OF EMBODIMENTS

Hereinafter, each embodiment for carrying out the present disclosure will be described with reference to the drawings.

Embodiment 1

Figure 1:
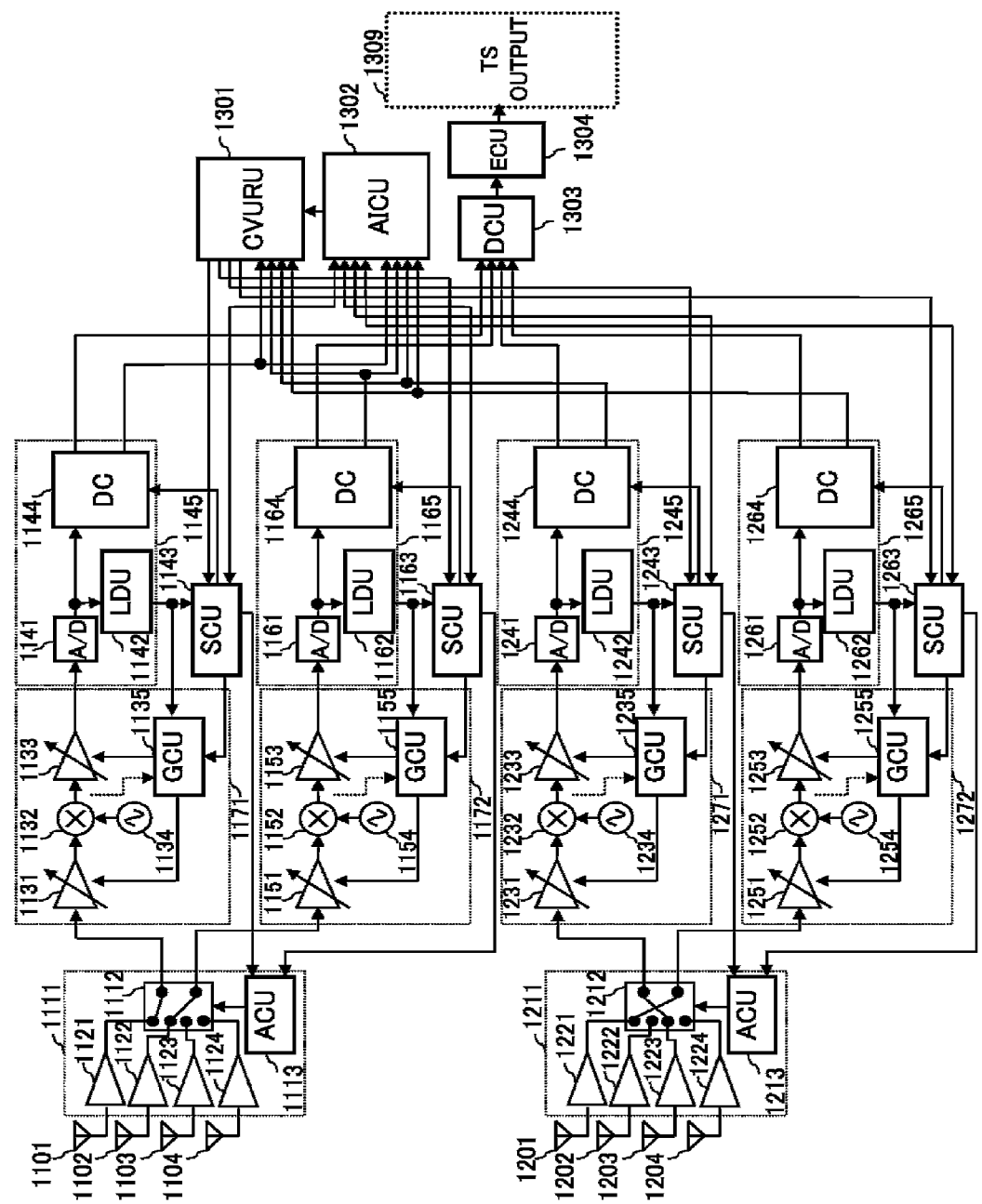
FIG. 1 is a configuration diagram of a diversity reception device according to Embodiment 1 of the present disclosure.

First, the configuration of a diversity reception device according to Embodiment 1 of the present disclosure will be described. FIG. 1 is a configuration diagram of the diversity reception device according to Embodiment 1 of the present disclosure. In FIG. 1, the diversity reception device according to Embodiment 1 of the present disclosure comprises antennas 1101 to 1104 and 1201 to 1204, antenna modules 1111 and 1211, low-noise amplifiers 1121 to 1124 and 1221 to 1224, antenna switches 1112 and 1212, antenna control units (ACU) 1113 and 1213, tuner units 1171, 1172, 1271, and 1272, radio-frequency amplifiers 1131, 1151, 1231, and 1251, mixers 1132, 1152, 1232, and 1252, local oscillators 1134, 1154, 1234, and 1254, intermediate-frequency amplifiers 1133, 1153, 1233, and 1253, gain control units (GCU) 1135, 1155, 1235, and 1255, demodulation units 1145, 1165, 1245, and 1265, A/D converters 1141, 1161, 1241, and 1261, level detection units (LDU) 1142, 1162, 1242, and 1262, demodulation circuits (DC) 1144, 1164, 1244, and 1264, switching/comparing units (SCU) 1143, 1163, 1243, and 1263, a correction value update/retention unit (CVURU) 1301, an antenna interchange control unit (AICU) 1302, a diversity combining unit (DCU) 1303, an error correction unit (ECU) 1304, and a back end unit 1309.

DTV-broadcast-wave received signals received at the antennas 1101 to 1104 and 1201 to 1204 are amplified by the low-noise amplifiers 1121 to 1124 and 1221 to 1224 within the antenna modules 1111 and 1211, and then two antennas are selected from the four antennas at each of the antenna switch 1112 and 1212 and the received signals are inputted into the tuner units 1171 and 1172 or 1271 and 1272 at the subsequent stage.

In the tuner units 1171, 1172, 1271, and 1272, the respective received signals are amplified by the radio-frequency amplifiers 1131, 1151, 1231, and 1251, and then frequency-converted and tuned by the mixers 1132, 1152, 1232, and 1252 with local oscillation signals of the local oscillators 1134, 1154, 1234, and 1254 into intermediate-frequency signals. The respective intermediate-frequency signals are further amplified by the intermediate-frequency amplifiers 1133, 1153, 1233, and 1253 and inputted into the demodulation units 1145, 1165, 1245, and 1265.

In the demodulation units 1145, 1165, 1245, and 1265, the respective intermediate-frequency signals are converted into digital signals by the A/D converters 1141, 1161, 1241, and 1261, and then inputted into the demodulation circuits 1144, 1164, 1244, and 1264 where demodulation is performed. Meanwhile, with regard to the outputs of the A/D converters 1141, 1161, 1241, and 1261, signal levels are detected by the level detectors 1142, 1162, 1242, and 1262, and the gain of the radio-frequency amplifiers 1131, 1151, 1231, and 1251 and the intermediate-frequency amplifiers 1133, 1153, 1233, and 1253 is adjusted via the gain control units 1135, 1155, 1235, and 1255 such that the input levels become appropriate.

On the outputs of the demodulation circuits 1144, 1164, 1244, and 1264 maximal ratio combining is performed by the diversity combining unit 1303, in which the phases of the outputs are matched and weighting is performed based on CNR. Then, in the case of OFDM, the operation of the phase matching and the weighting based on CNR is preferably performed for each subcarrier. At the error correction unit 1304, error correction and the like are performed, and a transport stream (TS) is outputted to the back end unit 1309. Meanwhile, in the process of demodulating, the demodulation circuits 1144, 1164, 1244, and 1264 output observed CNRs of the received signals in the respective chains, and the CNRs are inputted into the correction value update/retention unit 1301 and the antenna interchange control unit 1302. In addition, information of a level difference between before and after antenna switching is inputted into the correction value update/retention unit 1301 via the antenna interchange control unit 1302, and an appropriate correction value at the time of antenna selection is calculated and updated with a later-described determined algorism at any time as necessary.

Figure 2:
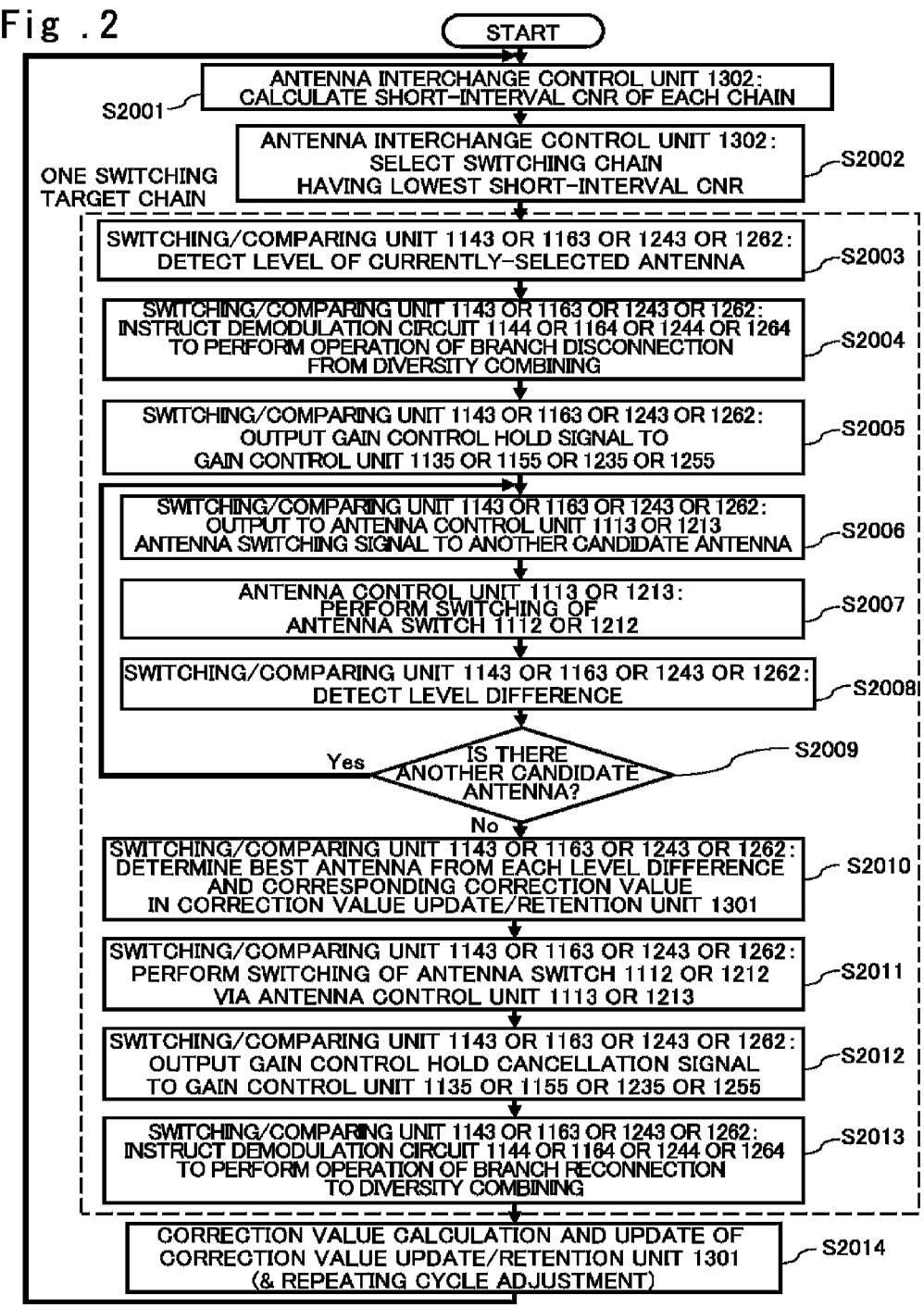
FIG. 2 is a flowchart showing a procedure of antenna switching selection in the diversity reception device according to Embodiment 1 of the present disclosure.

FIG. 2 is a flowchart showing a procedure of antenna switching selection in the diversity reception device according to Embodiment 1 of the present disclosure. It should be noted that with regard to the procedure of the antenna switching selection, the corresponding configuration shown in FIG. 1 and an operation procedure will be described together by using the flowchart in FIG. 2.

First, the antenna interchange control unit 1302 finds and determines one chain having a lowest CNR and issues an instruction to the switching/comparing unit 1143, 1163, 1243, or 1263 of the chain. The antenna interchange control unit 1302 observes the CNR of each chain over a determined short interval, and calculates a short-interval CNR as a median or average (step S2001). The determined short interval is preferably a period of time suitable for eliminating the influence of fast fading with multipath coherency in the case of vehicle onboard reception, that is, a period of time corresponding to about several ten times of moving for a wavelength. Thus, when the determined short interval is represented as a time interval, the determined short interval is desirably changed in inverse proportion to a moving speed by using means for detecting the moving speed, but the determined short interval may be a previously-calculated fixed (constant) time interval for including the case of indoor reception. Alternatively, in the case of a fixed time interval in vehicle onboard reception, in view of great variation during high-speed travelling, explicit median or average processing may not be performed and a time interval for CNR observation may be used instead (step S2001). Then, the antenna interchange control unit 1302 selects and determines a chain having a lowest short-interval CNR as a switching target (step S2002).

FIG. 2 shows a general example, but the operation is the same even when any chain is selected. Thus, hereinafter, the operation in the case where the uppermost chain in FIG. 1 becomes a switching target chain will be described as an example.

In this case, first, the switching/comparing unit 1143 detects the output level of the A/D converter 1141 for the currently-selected antenna from the output of the level detection unit 1142, and stores the output level (step S2003). It should be noted that during normal reception, the output level is controlled into a constant level by feedback control via the gain control unit 1135, and thus a control target value can be set as default and level measurement and storage before switching can be omitted.

Thereafter, the switching/comparing unit 1143 performs an operation of causing the demodulation circuit 1144 to perform disconnection from the diversity combining unit 1303 and to reduce influence involved with antenna switching (step S2004), outputs a gain control hold signal for the gain control unit 1135, temporarily halts the gain control unit 1135 (step S2005), and then outputs an antenna switching carrier-to the antenna control unit 1113 (step S2006). Then, the antenna control unit 1113 changes the contact point of the antenna switch 1112 to an antenna which is not currently used (step S2007). Then, the switching/comparing unit 1143 detects again the output level of the A/D converter 1141 for the switched antenna from the output of the level detection unit 1142, and stores the difference (step S2008).

In the example of FIG. 1, two antennas are selected from the four antennas, and thus the switching/comparing unit 1143 determines whether any other selectable candidate antenna is present (step S2009). When another selectable candidate is present at step S2009, the operations at steps S2006 to S2008 are repeated, the level for each antenna is detected, and the difference is stored.

When no other selectable candidate antenna is present at step S2009, the switching/comparing unit 1143 determines a best antenna from each level difference between the current antenna and each switching selection candidate antenna and in consideration of the correction value, in the correction value update/retention unit 1301, corresponding to each antenna (step S2010), and changes the contact point of the antenna switch 1112 via the antenna control unit 1113 (step S2011). In addition, the switching/comparing unit 1143 restarts the gain control of the gain control unit 1135 (step S2012), returns the demodulation operation of the demodulation circuit 1144 to a normal operation, and connects again the demodulation circuit 1144 to the diversity combining unit 1303 (step S2013). As described above, for each chain having a lowest CNR sequencially, an operation of quickly performing detection and determination to interchange the antenna connected to the chain with a better one without any influence is repeated (step S2014).

Figure 3:
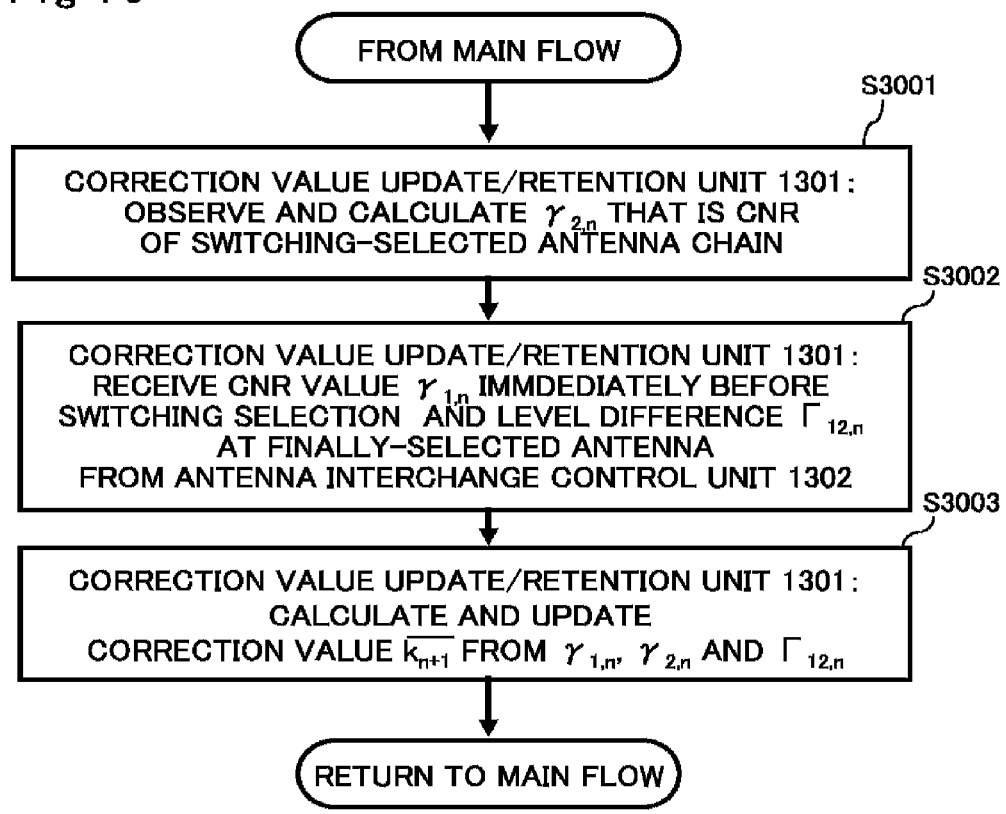
FIG. 3 is a flowchart showing a procedure of correction value calculation and update in the diversity reception device according to Embodiment 1 of the present disclosure.
Figure 4:
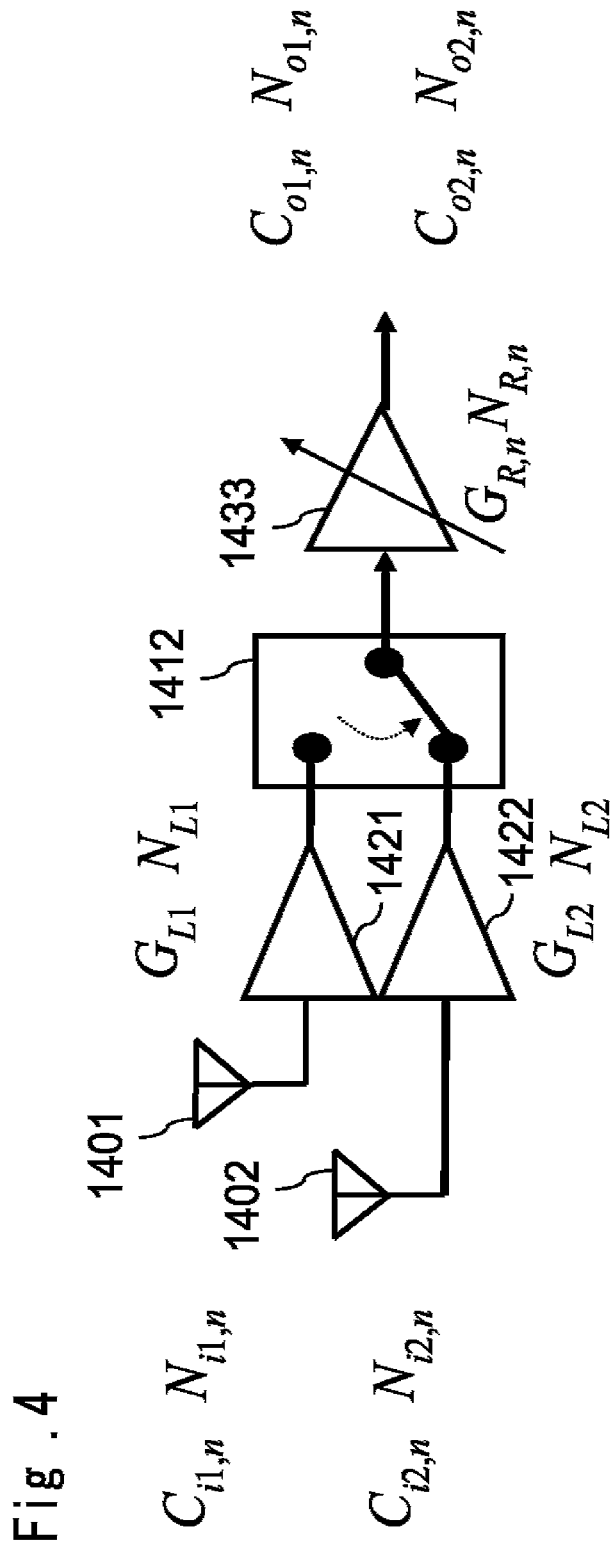
FIG. 4 is a configuration diagram of a simplified radio-frequency system for explaining the principle of the procedure of the correction value calculation and update in the diversity reception device according to Embodiment 1 of the present disclosure.
Figure 5:
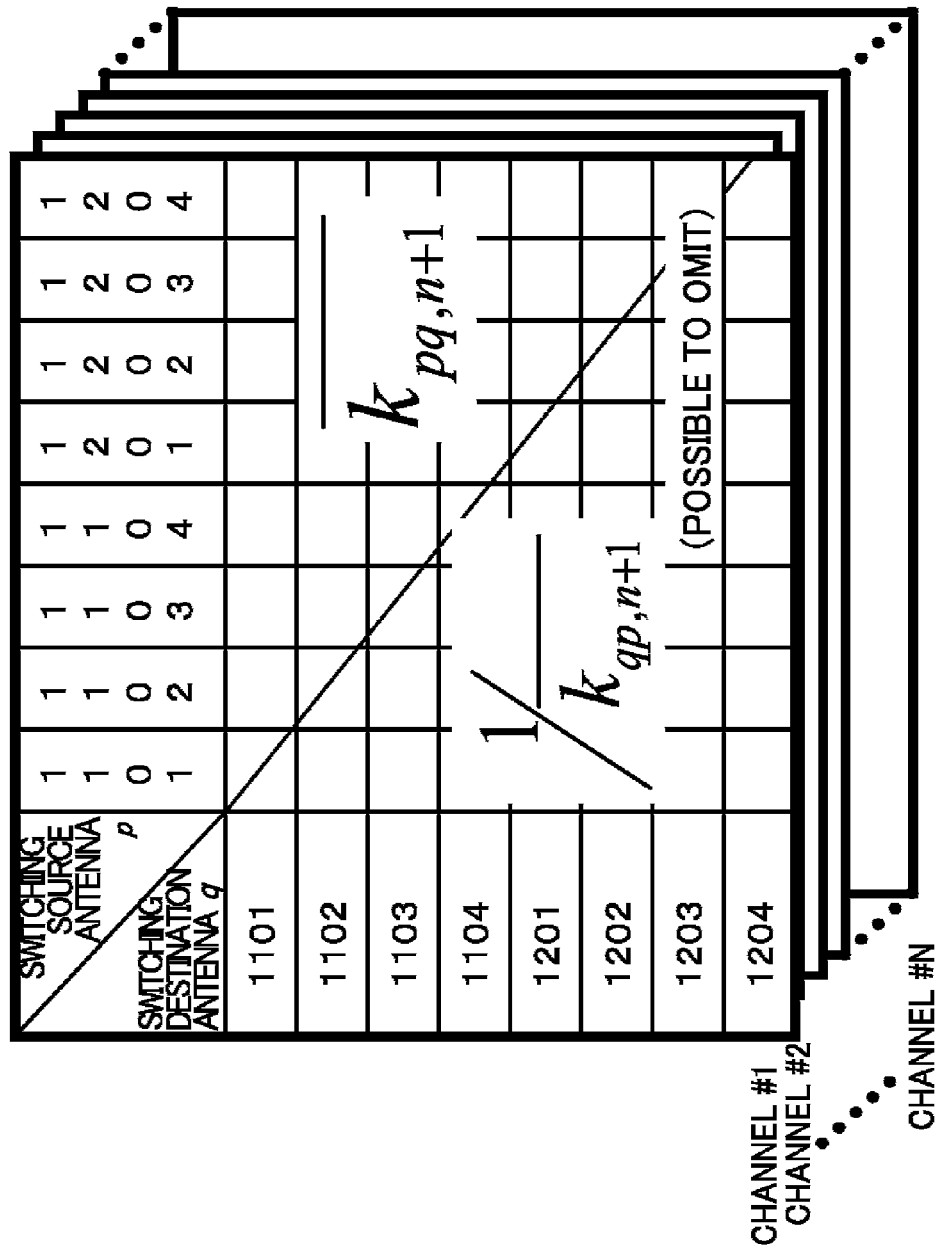
FIG. 5 is a diagram of a correction value table in the diversity reception device according to Embodiment 1 of the present disclosure.

FIG. 3 is a flowchart showing a procedure of correction value calculation and update in the diversity reception device according to Embodiment 1 of the present disclosure, FIG. 4 is a configuration diagram of a simplified radio-frequency system for explaining the principal of the calculation, and FIG. 5 is an example of a correction value table.

In FIG. 4, the radio-frequency system composes antennas 1401 and 1402, low-noise amplifiers 1421 and 1422, an antenna switch 1412, and a variable gain amplifying unit 1433. Here, a simplified case where switching selection is performed by the antenna switch 1412 on the two antennas 1401 and 1402 is considered. It should be noted that the chains of the radio-frequency amplifiers 1131, 1151, 1231, and 1251, the mixers 1132, 1152, 1232, and 1252, and the intermediate-frequency amplifiers 1133, 1153, 1233, and 1253 in FIG. 1 are collectively represented by using the variable gain amplifying unit 1433.

Here, as shown in FIG. 4, in antenna switching of n-th time (n is a natural number), switching is performed from the antenna 1401 to the antenna 1402. Where, before and after the switching, the signal power from the antenna 1401 is $C_{i1,n}$; the external noise power is $N_{i1,n}$; the signal power from the antenna 1402 is $C_{i2,n}$; the external noise power is $N_{i2,n}$; the gain of the low-noise amplifier 1421 is $G_{L1}$; noise generated in the low-noise amplifier 1421 is $N_{L1}$; the gain of the low-noise amplifier 1422 is $G_{L2}$; noise generated in the low-noise amplifier 1422 is $N_{L2}$; the gain of the variable gain amplifying unit 1433 is $G_{R,n}$; and noise generated in the variable gain amplifying unit 1433 is $N_{R,n}$, then, the signal power $C_{o1,n}$ and $C_{o2,n}$ and the noise power $N_{o1,n}$ and $N_{o2,n}$ at the output of the variable gain amplifying unit 1433 when each antenna is selected are represented by Mathematical Formula 1 and Mathematical Formula 2.

$$\begin{cases} C_{o1,n} = C_{i1,n} \times G_{L1} \times G_{R,n} \\ C_{o2,n} = C_{i2,n} \times G_{L2} \times G_{R,n} \end{cases} \quad \text{[Mathematical Formula 1]}$$

$$\begin{cases} N_{o1,n} = N_{i1,n} \times G_{L1} \times G_{R,n} + N_{L1} \times G_{R,n} + N_{R,n} \\ N_{o2,n} = N_{i2,n} \times G_{L2} \times G_{R,n} + N_{L2} \times G_{R,n} + N_{R,n} \end{cases} \quad \text{[Mathematical Formula 2]}$$

Here, when the gain $G_{L1}$, $G_{L2}$, and $G_{R,n}$ is sufficiently great and the external noise $N_{i1,n}$ and $N_{i2,n}$ is relatively great, Mathematical Formula 2 can be approximated to Mathematical Formula 3.

[Mathematical Formula 3]

$$\begin{cases} N_{o1,n} = N_{i1,n} \times G_{L1} \times G_{R,n} + N_{L1} \times G_{R,n} + N_{R,n} \approx N_{i1,n} \times G_{L1} \times G_{R,n} \\ N_{o2,n} = N_{i2,n} \times G_{L2} \times G_{R,n} + N_{L2} \times G_{R,n} + N_{R,n} \approx N_{i2,n} \times G_{L2} \times G_{R,n} \end{cases}$$

Meanwhile, before and after switching selection, CN ratios $\gamma_{1,n}$ and $\gamma_{2,n}$ at each antenna and a signal level difference $\Gamma_{12,n}$ are detected and stored. The CN ratios $\gamma_{1,n}$ and $\gamma_{2,n}$ and the signal level difference $\Gamma_{12,n}$ are represented by Mathematical Formula 4. Thus, when Mathematical Formula 3 is used in conjunction, it is recognized that the relationship shown by Mathematical Formula 5 is established.

$$\gamma_{1,n} = \frac{C_{o1,n}}{N_{o1,n}}, \gamma_{2,n} = \frac{C_{o2,n}}{N_{o2,n}}, \Gamma_{12,n} = \frac{C_{o2,n}}{C_{o1,n}} \quad \text{[Mathematical Formula 4]}$$

$$\frac{\gamma_{2,n}}{\gamma_{1,n}} = \frac{C_{o2,n}}{C_{o1,n}} \times \frac{N_{o1,n}}{N_{o2,n}} = \quad \text{[Mathematical Formula 5]}$$

$$\Gamma_{12,n} \times \frac{N_{o1,n}}{N_{o2,n}} = \Gamma_{12,n} \times \frac{N_{i1,n} \times G_{L1}}{N_{i2,n} \times G_{L2}}$$

The gain $G_{L1}$ and $G_{L2}$ of the low-noise amplifier varies mainly due to drift based on temperature or the like and individual difference and does not rapidly vary as compared to fading involved with travelling in a vehicle onboard case.

In addition, with regard to the external noise $N_{i1,n}$ and $N_{i2,n}$, in a situation in vehicle onboard reception, noise coming from a neighboring onboard electrical component is relatively great. Although the level may rise due to interference from other wireless systems or the like or ambient noise in an urban area, these interference/noise does not change as rapidly as fading accompanied with travelling. In indoor reception, due to use in a semi-fixed state, similarly, rapid change does not occur. In other words, where the coefficient in the right-hand side of Mathematical Formula 5 is defined as $k_{12,n}$, $k_{12,n}$ is represented by Mathematical Formula 6.

$$k_{12,n} = \frac{N_{i1,n} \times G_{L1}}{N_{i2,n} \times G_{L2}} = \frac{\gamma_{2,n}}{\gamma_{1,n}} \times \frac{1}{\Gamma_{12,n}} \quad \text{[Mathematical Formula 6]}$$

This does not change as rapidly as fading accompanied with travelling, is calculated from the actually-measured values $\gamma_{1,n}$ and $\gamma_{2,n}$ and $\Gamma_{12,n}$, and is represented as Mathematical Formula 7 from a past observation/calculation result, for example, from (m+1)-th time in the past (m is a natural number).

$$\overline{k_{12,n+1}} = \frac{1}{m+1} \sum_{n-m}^{n} k_{12,n} \quad \text{[Mathematical Formula 7]}$$

In an occasion subsequent to n+1, when a signal level difference $\Gamma_{12,n+1}$ is observed, an improvement for the CN ratio after switching can be estimated as Mathematical Formula 8 with the left-hand side of the Mathematical Formula 7 as a correction value.

$$\frac{\gamma_{2,n+1}}{\gamma_{1,n+1}} = \Gamma_{12,n+1} \times \overline{k_{12,n+1}} \quad \text{[Mathematical Formula 8]}$$

It should be noted that in Mathematical Formula 7, the calculation should be performed as a logarithm (decibel) not as a true value, and the average of the right-hand side may be an average over corresponding decibel values. In addition, preferably, the calculation may be performed by multiplication by a coefficient that decreases weighting as the time goes back for a longer time in the past, such as a so-called forgetting factor. Alternatively, with m=0, the result of the last time may be used as it is. Further, when a correction value corresponding to the antenna interchange has not been updated, an initial value of 1 is preferably used. Moreover, when a determined period of time has elapsed from last update of the correction value corresponding to the antenna interchange, the correction value may be returned to the initial value of 1, switching selection may be performed by using this correction value, and then update of the correction value for the next time may be performed.

Meanwhile, coefficients provided when the same pair of antennas are switched in the reverse direction are inverse to each other, that is, have the relationship in Mathematical Formula 9. Thus, the calculation of the left-hand side of Mathematical Formula 7, which is the correction value, is performed by also using an observation value in the inverse relationship, whereby the update frequency can be increased and more detailed update can be performed. In addition, Mathematical Formula 10 is also established, and thus the storage area for the correction value may be reduced by half by using this property. By so doing, the storage capacity for the correction value table can be reduced.

$$k_{12,n} = \frac{1}{k_{21,n}} \quad \text{[Mathematical Formula 9]}$$

$$\overline{k_{12,n+1}} = \frac{1}{\overline{k_{21,n+1}}} \quad \text{[Mathematical Formula 10]}$$

FIG. 3 is a flowchart showing an example of the procedure of the correction value calculation and update described above. Immediately after the end of the procedure of the antenna switching selection at step S2013 in FIG. 2, the correction value update/retention unit 1301 initially observes the CNR of the demodulation circuit in the chain for the newly switching-selected antenna, to obtain $\gamma_{2,n}$ (step S3001).

Then, the correction value update/retention unit 1301 obtains an immediately previous CNR measurement value $\gamma_{1,n}$ and a level difference $\Gamma_{12,n}$ for the antenna before the switching, from the antenna interchange control unit 1302 (step S3002). The left-hand side of Mathematical Formula 7, which is the correction value, is calculated from these three values and updated as described above (step S3003), and the procedure returns to the main flow in FIG. 2.

FIG. 5 shows an example of the correction value table. Regarding parameters in the table, differences in the gain $G_{L1}$ and $G_{L2}$ of the low-noise amplifier and the external noise power $N_{i1,n}$ and $N_{i2,n}$ are produced depending on the antennas before and after switching as well as a reception channel, and the reception channel is added. Thus, the table becomes such a three-dimensional table. It should be noted that for the update of the correction value, the relationship in Mathematical Formula 9 or the relationship in Mathematical Formula 10 is used, and thus only the upper right (or lower left) portion of the table may be used. In the procedure in FIG. 3, the table in FIG. 5 is calculated and updated, and at step S2010 in FIG. 2, the corresponding correction value is read out, correction is performed, an improvement amount of the CNR is estimated from the level difference, and the antenna having a maximum improvement amount of the CNR, namely, the antenna having a highest CNR, is determined. In this manner, the chain having a lowest CNR is connected to the antenna determined to have the highest CNR among the antennas connectable to the chain.

The antenna modules 1111 and 1211 are normally attached near the antennas 1101 to 1104 and the antennas 1201 to 1204, for example, to a windshield or the like, and are independently installed. The antenna modules 1111 and 1211 are connected via coaxial cables to the tuner units 1171, 1172, 1271, and 1272 within a separate body housing placed in a dashboard or under a seat. It is actually difficult to previously measure variations of the gain of the low-noise amplifiers 1121 to 1124 and 1221 to 1224, and perform correction for cable losses under specifying the connection relationship and all combinations with the body housing, and thus the adaptive and automatic correction as described above is useful. Furthermore, when noise interference waves come from a specific direction, the correction value adaptively follows and functions in such a way that it is unlikely to select antennas having gain in the direction of noise interference. Thus, the effect of avoiding the noise interference is also obtained.

Figure 6:
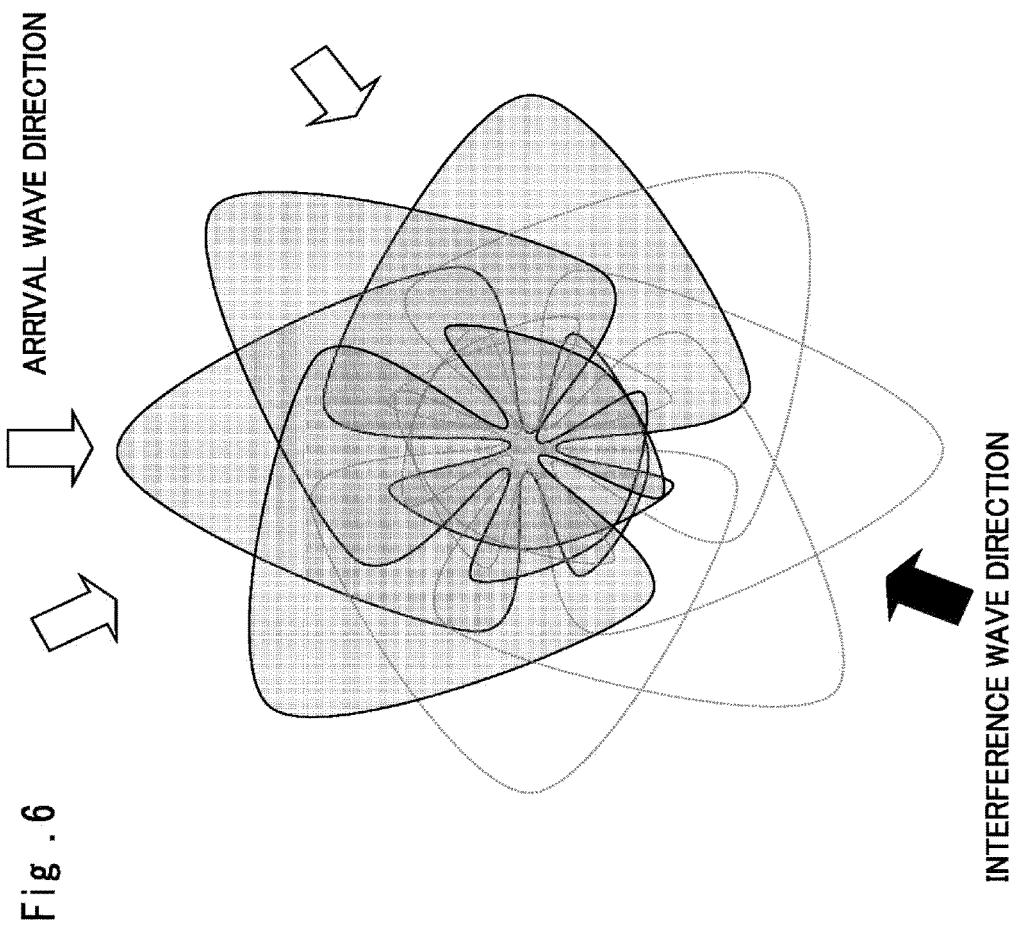
FIG. 6 is a schematic diagram of antenna selection and combined directional characteristics in the case where there are noise interference waves in Embodiment 1 of the present disclosure.

FIG. 6 is a schematic diagram showing the relationship between antenna selection and combined directional characteristics in the case where there are noise interference waves. As a result, four antennas that are likely to receive arrival waves and unlikely to receive noise interference waves are selected from eight antennas having different directional characteristics and are subjected to diversity combining. Thus, combined directional characteristics that are biased to the direction of the object arrival waves and avoid the direction of the noise interference waves are obtained.

As described with reference to FIGS. 1 to 6, according to this configuration and procedure, for each chain having a lowest CNR, the operation is repeated in which the level differences of other candidate antennas are quickly observed for switching and a better antenna is accurately selected for interchange by using the correction value which is incorporated into the procedure and adaptively calculated and updated. By so doing, antenna switching selection which causes less deterioration can be performed in a shorter time. In addition, since switching selection can be accurately performed despite external noise or inconsistencies in preamplifier gain, reception having better performance can be performed while holding down cost increases.

It should be noted that the example in FIG. 1 is an assumed example in which the antennas 1101 to 1104 and the antennas 1201 to 1204 are film antennas for vehicle onboard reception and are divided into two right and left groups and attached to the left and right of the windshield. However, these antennas may be combined into one group, the antenna modules 1111 and 1211 may be integrated with each other, and the antenna switches 1112 and 1212 may perform switching selection of four antennas from eight antennas.

As a matter of course, the numbers of antennas are not limited to 8 and 4, and may be another combination of numbers such as switching selection of four antennas from six antennas or switching selection of three antennas from eight antennas.

In addition, each antenna does not necessarily need to have definite directional characteristics. Preferably, the directivity pattern of each antenna is different from those of the other antennas. For example, in the case of film antennas for vehicle onboard reception, this condition is met even when each antenna is the same, since the directional characteristics are varied due to the relationship with the vehicle body, depending on the attached directions or the attached positions.

It should be noted that it is also possible to use, in conjunction, an antenna having weak directivity and an antenna having strong directivity. For example, in vehicle onboard reception, propagation along a road is often remarkable, and an antenna having directivity in the front-back direction and an antenna having weak directivity may be used in conjunction.

Furthermore, in indoor reception, an omni-directional antenna that can cover arrival waves coming from various directions due to reflection and scattering at a ceiling or a wall and has weak directivity and an antenna that supports waves incoming and arriving through an opening such as a window and has relatively strong directivity may be used in conjunction.

It should be noted that the repeating cycle of the entire procedure may be fixed or may be obtained by adding a required processing time or the like to the short interval at step S2001. In the case where the short interval at step S2001 is variable in inverse proportion to a moving speed, the repeating cycle may change in accordance with the short interval. In addition, the repeating cycle may change in accordance with the value of the lowest CNR. Furthermore, the calculation and update of the correction value by the correction value update/retention unit 1301 is preferably performed over the required processing time. Moreover, the operation of causing the demodulation circuit 1144 to perform disconnection from the diversity combining unit 1303 and to reduce the influence involved with antenna switching is preferably performed, for example, after timing of a self-running state is maintained prior to an operation in the case where it takes time for return such as synchronization and then weighting for combining at the diversity combining unit 1303 is decreased for a chain having a low CNR. In addition, at step S2002, in restarting the gain control of the gain control unit 1135, the level difference is previously recognized, and thus it is preferred to perform offset by the level difference and restart the control, since later reception can more quickly be returned.

It should be noted that the temporary halt of the gain control (step S2005) and the restart (step S2012) may be omitted when a control time constant is sufficiently great, since a change of the gain control amount between both steps can be nearly neglected. In addition, the operation of branch-disconnection from the diversity combining (step S2004) and the operation of branch-reconnection (step S2013) can be omitted. This is because, as long as the CNR observation value of the chain instantly and favorably responds so as to decrease with noise in antenna switching, the operation of branch-disconnection or branch-reconnection is equivalently performed by the maximal ratio combining at the diversity combining unit 1303, and correction is performed at the error correction unit 1304 with respect to occurrence of slight errors.

It should be noted that in application in an environment in which variation of the gain is small and the influence of external noise is small, when the correction value calculation and update by the correction value update/retention unit 1301 and at step S2014 is omitted and the determination is performed at step S2010 with each level difference, not by using the correction value, omission and mounting can be performed in consideration of cost rather than performance. In addition, in this case, in level comparison with antenna switching, the gain control may not be temporarily halted, and the direction of the gain control before and after switching may be observed to determine the level difference. For example, when control is performed so as to reduce the gain after antenna switching, a new antenna is determined to have a higher level, and switching to the antenna is performed.

Embodiment 2

Figure 7:
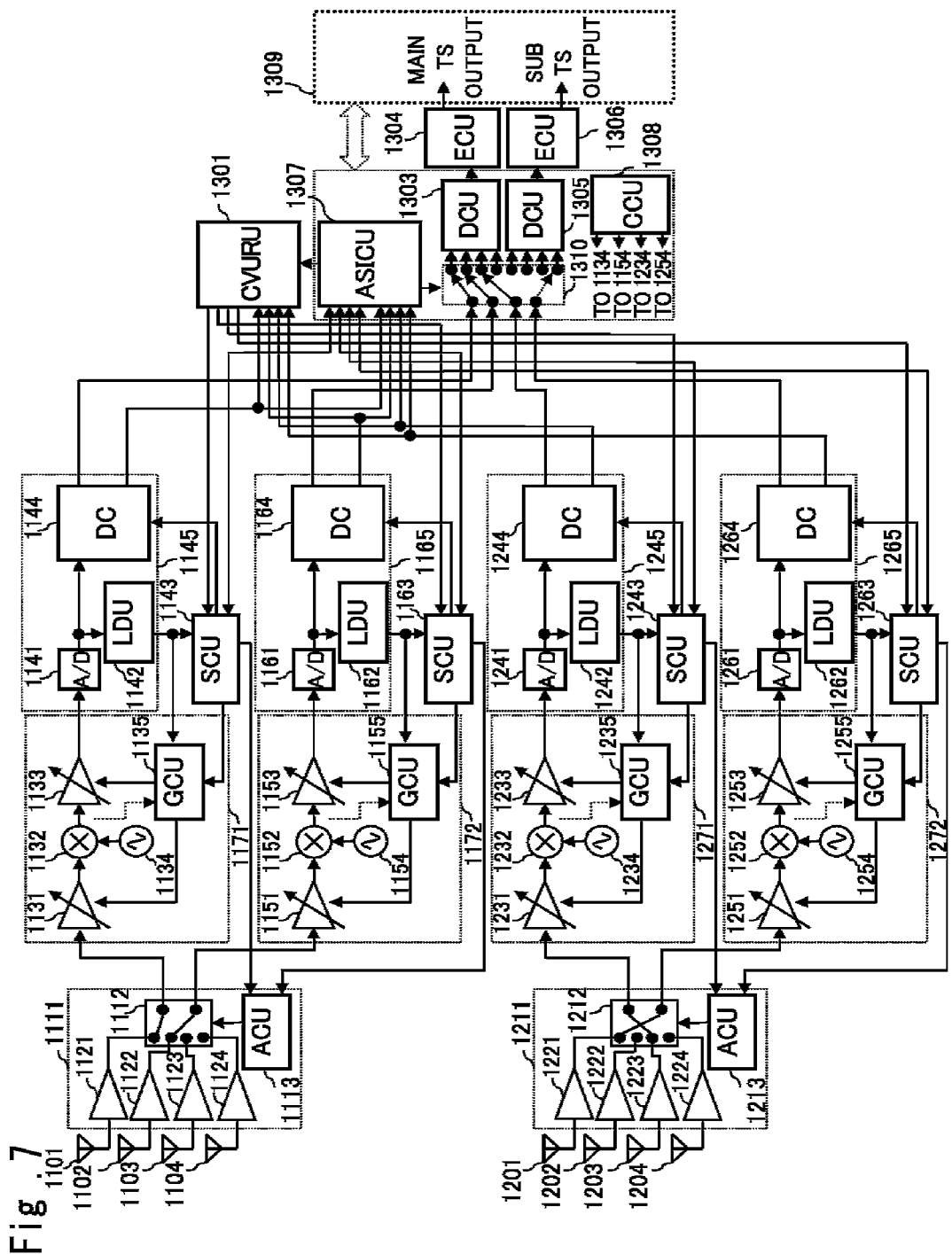
FIG. 7 is a configuration diagram of a diversity reception device according to Embodiment 2 of the present disclosure.

FIG. 7 is a configuration diagram of a diversity reception device according to Embodiment 2 of the present disclosure. In FIG. 7, the diversity reception device according to Embodiment 2 of the present disclosure comprises antennas 1101 to 1104 and 1201 to 1204, antenna modules 1111 and 1211, low-noise amplifiers 1121 to 1124 and 1221 to 1224, antenna switches 1112 and 1212, antenna control units (ACU) 1113 and 1213, tuner units 1171, 1172, 1271, and 1272, radio-frequency amplifiers 1131, 1151, 1231, and 1251, mixers 1132, 1152, 1232, and 1252, local oscillators 1134, 1154, 1234, and 1254, intermediate-frequency amplifiers 1133, 1153, 1233, and 1253, gain control units (GCU) 1135, 1155, 1235, and 1255, demodulation units 1145, 1165, 1245, and 1265, A/D converters 1141, 1161, 1241, and 1261, level detection units (LDU) 1142, 1162, 1242, and 1262, demodulation circuits (DC) 1144, 1164, 1244, and 1264, switching/comparing units (SCU) 1143, 1163, 1243, and 1263, a correction value update/retention unit (CVURU) 1301, diversity combining units (DCU) 1303 and 1305, error correction units (ECU) 1304 and 1306, an antenna main/sub system interchange control unit (ASICU) 1307, a channel control unit (CCU) 1308, a back end unit 1309, and a main/sub system selector 1310.

The diversity reception device according to Embodiment 2 of the present disclosure differs from that of Embodiment 1 (FIG. 1) in that the main/sub system selector 1310 is added, two systems of the diversity combining units 1303 and 1305 and the error correction units 1304 and 1306 are accordingly prepared at the subsequent stage, the antenna main/sub system interchange control unit 1307 for also controlling the main/sub system selector 1310 is arranged instead of the antenna interchange control unit 1302, and the channel control unit 1308 for controlling the local oscillators 1134, 1154, 1234, and 1254 in conjunction with the control is added. The other configuration is the same as that in the description of Embodiment 1 (FIG. 1), and thus the description thereof is omitted.

In mobile reception of DTV broadcast waves such as vehicle onboard reception (including the case where a device for indoor reception is operated in a vehicle), it is desirable to smoothly and quickly switch to a better frequency channel of the same broadcast content group at a reception area fringe. For that, it is desirable to temporarily receive signals of two frequency channels at the same time. Embodiment 2 is an application example with a configuration that enables such two-channel simultaneous reception.

In FIG. 7, the channel control unit 1308 controls the local oscillators 1134, 1154, 1234, and 1254 in accordance with a control instruction from the back end unit 1309, and allocates optional chains to another frequency channel and sets and controls the optional chains for two-channel reception. The main/sub system selector 1310 allocates the corresponding chains in accordance with this setting, performs switching selection, and inputs demodulated signals into the diversity combining units 1303 and 1305, diversity combining is performed, processing such as error control is performed at the error correction units 1304 and 1306, and TSs of the two systems are outputted to the back end unit 1309.

Figure 8:
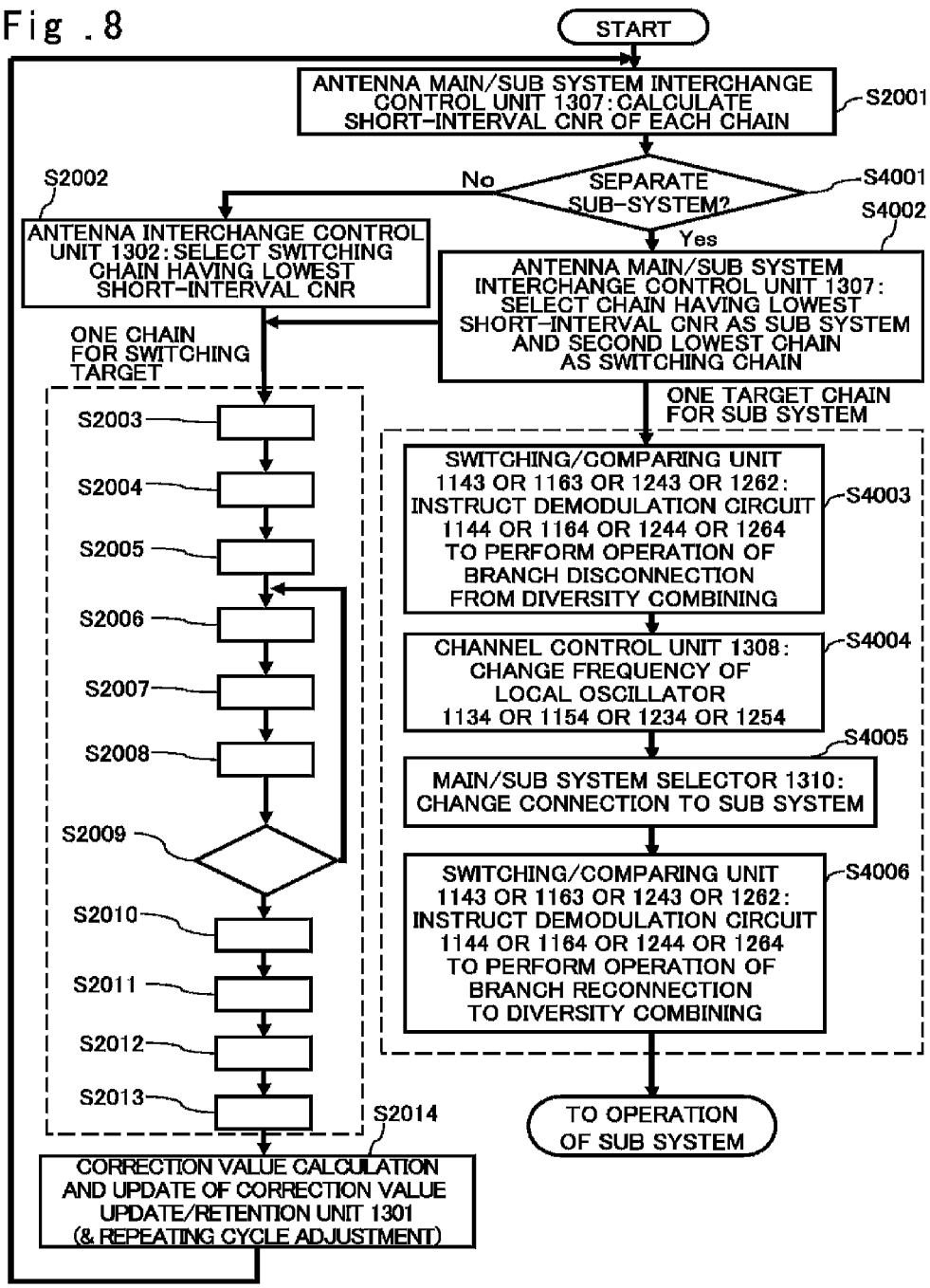
FIG. 8 is a flowchart showing a procedure of antenna switching selection and system control in the diversity reception device according to Embodiment 2 of the present disclosure.
Figure 9:
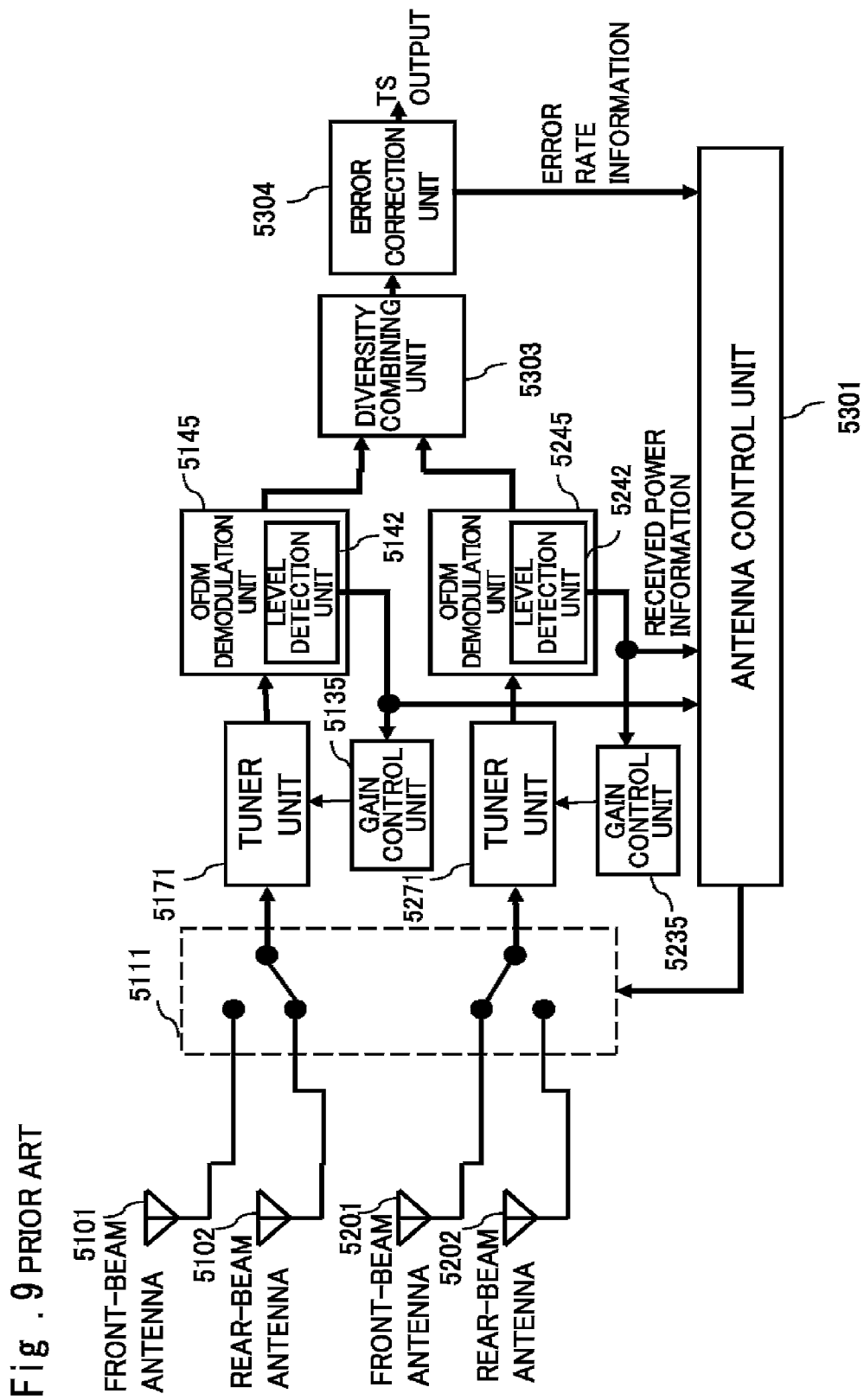
FIG. 9 is a configuration diagram of a diversity reception device of a first conventional example.
Figure 10:
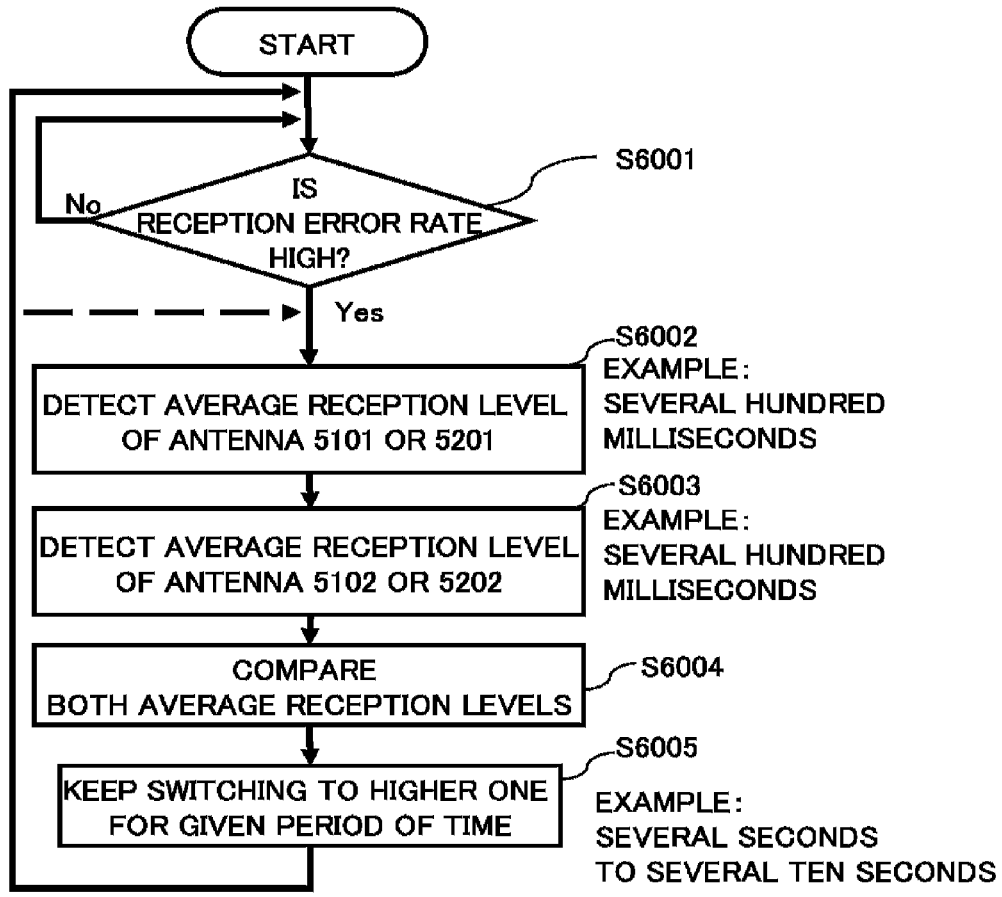
FIG. 10 is a flowchart showing a procedure of antenna switching selection in the diversity reception device of the first conventional example.
Figure 11:
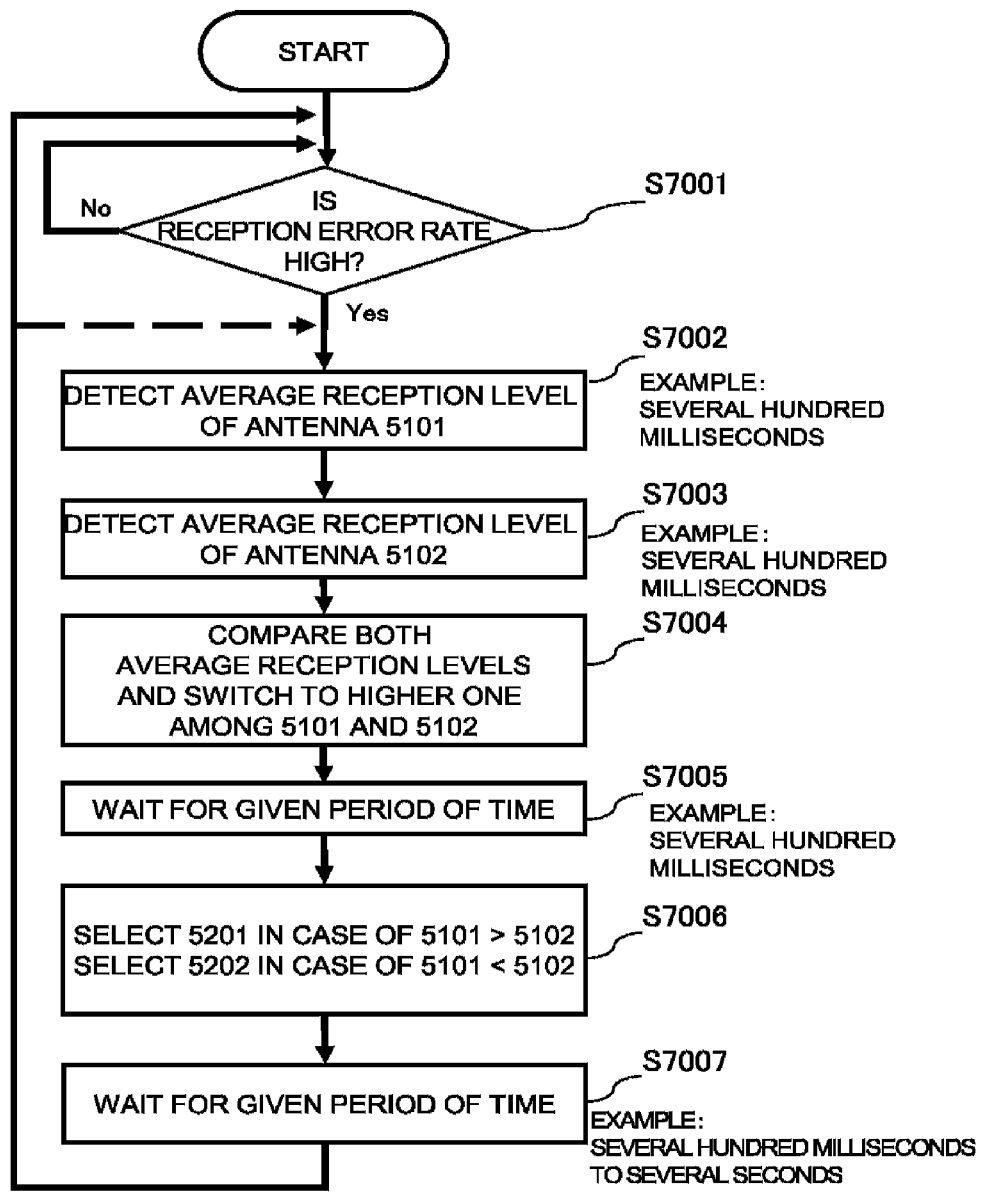
FIG. 11 is a flowchart showing a procedure of antenna switching selection in the diversity reception device of the first conventional example.
Figure 12:
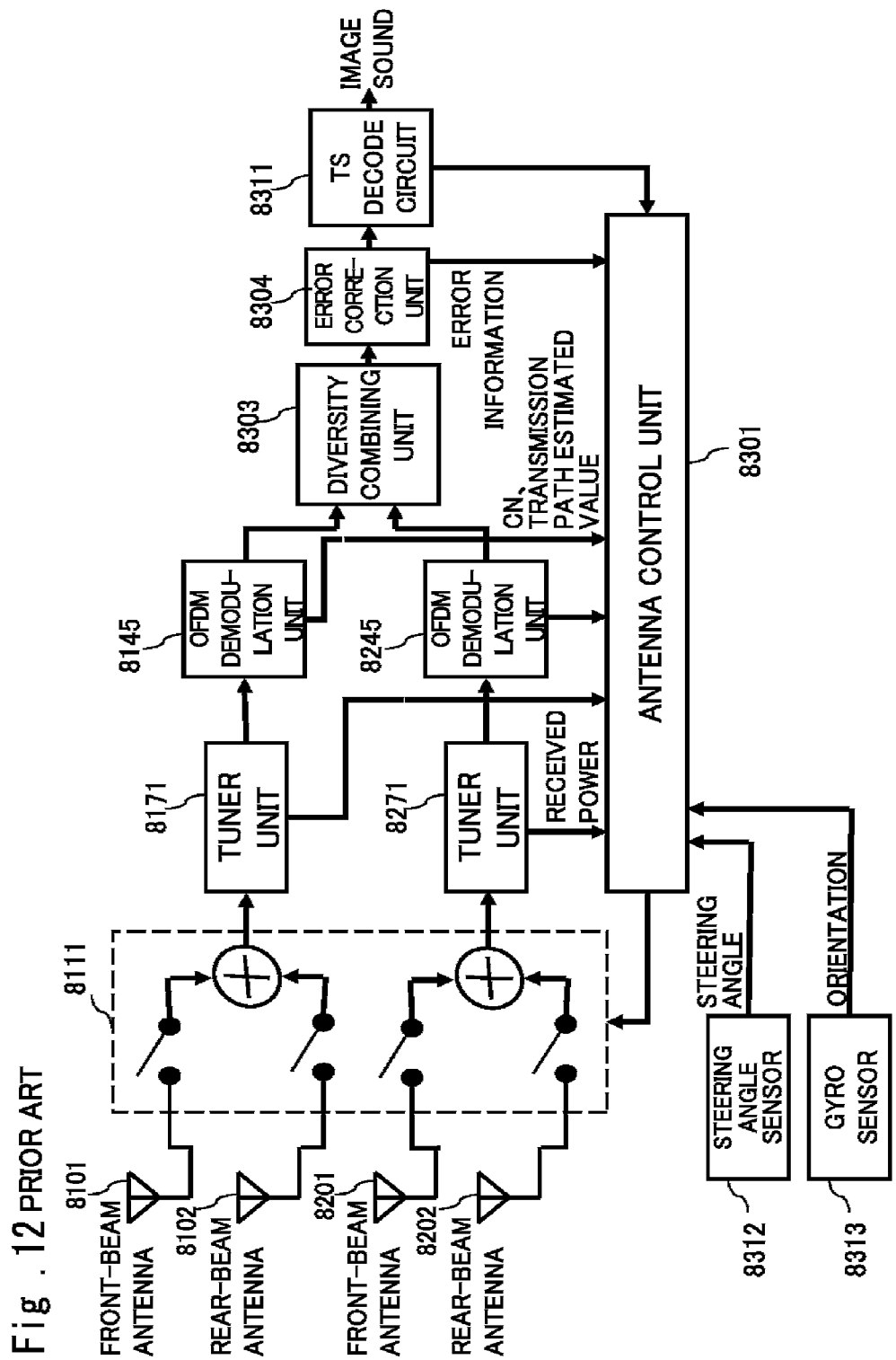
FIG. 12 is a configuration diagram of a diversity reception device of a second conventional example.
Figure 13:
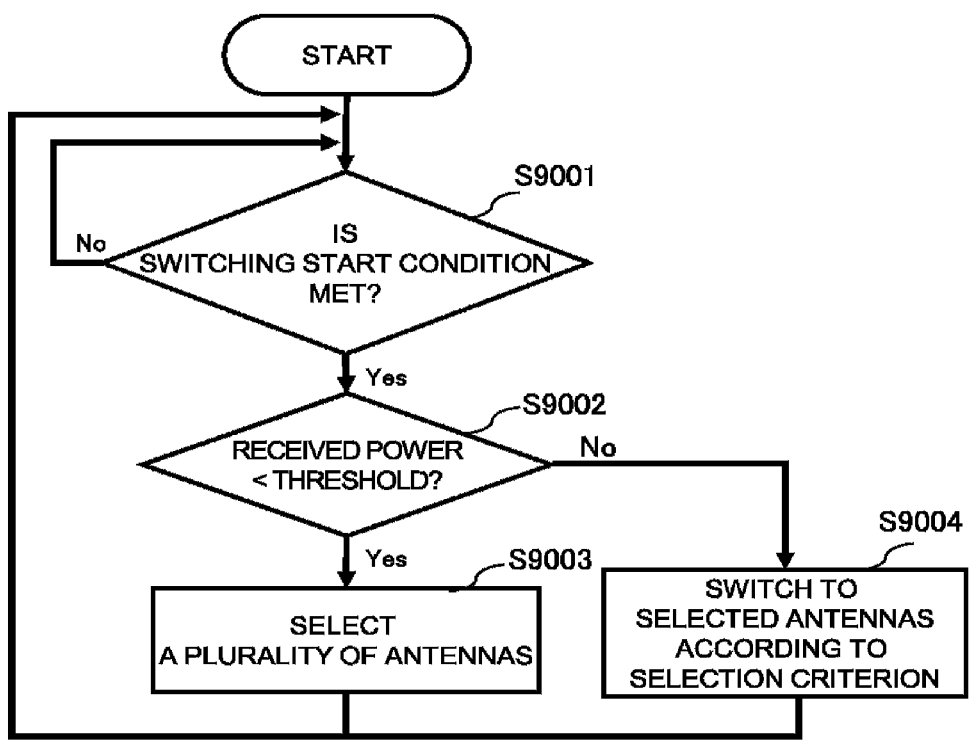
FIG. 13 is a flowchart showing a procedure of antenna switching selection in the diversity reception device of the second conventional example.

FIG. 8 is a flowchart showing a procedure of antenna switching selection and system control in the diversity reception device according to Embodiment 2 of the present disclosure. Similarly to the case of Embodiment 1, first, the antenna main/sub system interchange control unit 1307 observes the CNR of each chain over a determined short interval and calculates a short-interval CNR as a median or average (step S2001). Then, the antenna main/sub system interchange control unit 1307 determines whether an instruction of sub-system separation has been given from the back end unit 1309 (step S4001).

When an instruction of sub-system separation has not been given at step S4001, a switching target chain having a lowest short-interval CNR is selected and determined (step S2002) and steps S2003 to S2014 are executed in the same manner as the case of Embodiment 1 (FIG. 2).

When an instruction of sub-system separation has been given at step S4001, the flow is advanced for the sub-system unlike Embodiment 1. First, the antenna main/sub system interchange control unit 1307 selects and determines a chain having a lowest short-interval CNR to be allocated as a sub-system, and selects and determines a chain having the second lowest, namely, next low short-interval CNR as a chain of an antenna switching target (step S4002). Regarding antenna switching selection, steps S2003 to S2014 are repeated, and steps S2001 and S2002 are further repeated unless an instruction of separation and addition is given to the sub-system. The number of chains is decreased, but an operation for performance improvement similar to the case of Embodiment 1 is performed, and thus the detailed description thereof is omitted.

FIG. 8 shows a general example, but the operation is the same even when any chain is selected as a sub-system. Thus, hereinafter, the operation in the case where the lowermost chain in FIG. 7 becomes a target chain as a sub-system will be described as an example. With respect to a separated/joined target chain to the sub-system, first, the switching/comparing unit 1263 performs an operation of causing the demodulation circuit 1264 to perform disconnection from the diversity combining unit 1303 and to reduce influence involved with antenna switching (step S4003). Then, the channel control unit 1308 changes the frequency of the local oscillator 1254 (step S4004). The main/sub system selector 1310 connects a demodulation output of the demodulation circuit 1264 to the diversity combining unit 1305 to change connection to the sub-system (step S4005). At the end, the switching/comparing unit 1263 returns the demodulation operation of the demodulation circuit 1264 to a normal operation and connects again the demodulation circuit 1264 to the diversity combining unit 1305 (step S4006) to start an operation of the sub-system.

As described above, while the reception channel is changed, searching is performed at all times, and searching for broadcast of the same group is performed. If a favorable reception channel is found, when the reception state of the sub-system is stabilized while reception is performed along with the main system, the sub-system is subsequently handled as a main system, and channel switching can be completed with interruption of received images being avoided as much as possible. In this case, during transition from searching to parallel reception, by repeating steps S4001 to S4006, the main system may compensate for performance with antenna switching selection to compensate for the decreased number of chains, and the sub-system may increase the number of allocated chains to increase the diversity ability, thereby stabilizing reception. When the sub-system stabilizes the reception, each of all the remaining chains is similarly handled as a sub-system, the sub-system is handled as a main system, and steps S2002 to S2014 are executed to complete the operation of channel switching.

According to this configuration, in addition to Embodiment 1, when an instruction of sub-system separation has been given, a chain having a lowest short-interval CNR is handled as a sub-system, and antenna interchange control similar to Embodiment 1 is performed on the remaining chains, whereby smooth and appropriate transition to two-channel parallel reception is performed. The reception performance is compensated for with the improvement mechanism similar to Embodiment 1 to compensate for the decrease of the chain number, whereby the reception state is kept stable and the advantage is produced that channel switching can be completed with interruption of received images being avoided as much as possible.

It should be noted that in each embodiment described above, the diversity reception device mainly using OFDM has been described, but it should be understood that the present disclosure is applicable to methods other than OFDM. Examples of the methods other than OFDM include vestigial sideband multilevel.

INDUSTRIAL APPLICABILITY

The diversity reception device according to the present disclosure is useful for vehicle onboard reception of digital television broadcasts with a plurality of antennas or the like.

| DESCRIPTION OF THE REFERENCE CHARACTERS | |
| --- | --- |
| 1101 to 1104, 1201 to 1204, 1401, 1402 | antenna |
| 1111, 1211 | antenna module |
| 1121 to 1124, 1221 to 1224, 1421, 1422 | low-noise amplifier |
| 1112, 1212, 1412 | antenna switch |
| 1113, 1213 | antenna control unit |
| 1171, 1172, 1271, 1272 | tuner unit |
| 1131, 1151, 1231, 1251 | radio-frequency amplifier |
| 1132, 1152, 1232, 1252 | mixer |
| 1134, 1154, 1234, 1254 | local oscillator |
| 1133, 1153, 1233, 1253 | intermediate-frequency amplifier |
| 1135, 1155, 1235, 1255 | gain control unit |
| 1433 | variable gain amplifying unit |
| 1145, 1165, 1245, 1265 | demodulation unit |
| 1141, 1161, 1241, 1261 | A/D converter |
| 1142, 1162, 1242, 1262 | level detection unit |
| 1144, 1164, 1244, 1264 | demodulation circuit |
| 1143, 1163, 1243, 1263 | switching/comparing unit |

-continued

DESCRIPTION OF THE REFERENCE CHARACTERS

| | |
|---|---|
| 1301 | correction value update/retention unit |
| 1302 | antenna interchange control unit |
| 1303, 1305 | diversity combining unit |
| 1304, 1306 | error correction unit |
| 1307 | antenna main/sub system interchange control unit |
| 1308 | channel control unit |
| 1309 | back end unit |
| 1310 | main/sub system selector |

The invention claimed is:

1. A diversity reception device comprising:
a plurality of antennas configured to receive digital broadcast waves;
an antenna switching unit configured to select and switch to a determined plural number of antennas out of the plurality of antennas;
a determined plural number of tuner units and a determined plural number of demodulation units, each of the tuner units and demodulation units corresponding to each of antennas selected by the antenna switching unit, configured to receive respective input of received signals of the selected antennas;
a diversity combining unit configured to perform diversity combining on outputs of the determined plural number of demodulation units as outputs of plural chains; and
an antenna interchange control unit configured to control the antenna switching unit to interchange an antenna; wherein
each of the demodulation units includes a demodulation circuit configured to measure a carrier-to-noise ratio of its received signal in the process of demodulating and a level detection unit configured to measure an input level of its received signal,
each of the tuner units includes a gain control unit configured to control gain in its received signal,
the antenna interchange control unit compares the carrier-to-noise ratio measured by the demodulation circuit of each chain among the plural chains and controls the antenna switching unit to sequentially switch connection with an antenna connected to a chain having a lowest carrier-to-noise ratio to connection with antennas connectable to said chain, during the diversity combining,
the level detection unit measures the input level for each of the connection-switched antennas, in the state where each connection-switched antenna is connected to the chain having the lowest carrier-to-noise ratio, and
the antenna interchange control unit
estimates, for each of the connection-switched antennas, the carrier-to-noise ratio on the basis of the measured input level, and
interchanges the antenna connected to the chain having the lowest carrier-to-noise ratio with an antenna for which the estimated carrier-to-noise ratio is highest among the connection-switched antennas.

2. The diversity reception device according to claim 1, wherein the antenna interchange control unit compares the carrier-to-noise ratio measured by the demodulation circuit of each chain, temporarily halts the gain control unit included in the tuner unit of a chain having a lowest carrier-to-noise ratio, and then controls the antenna switching unit to sequentially switch connection with an antenna connected to the chain having the lowest carrier-to-noise ratio to connection with antennas connectable to said chain.

3. The diversity reception device according to claim 1, further comprising a correction value update/retention unit configured to retain a correction value table used for determination in interchanging the antenna, wherein the antenna interchange control unit:
compares the carrier-to-noise ratio measured by the demodulation circuit of each chain over a determined short interval by a determined method, temporarily halts the gain control unit included in the tuner unit of a chain having a lowest carrier-to-noise ratio, and then controls the antenna switching unit to sequentially switch connection with an antenna connected to the chain having the lowest carrier-to-noise ratio to connection with antennas connectable to said chain; and
refers to the correction value table retained by the correction value update/retention unit and estimates an antenna having a highest carrier-to-noise ratio among the connection-switched antennas on the basis of the input level measured by the level detection unit, and interchanges the antenna connected to the chain having the lowest carrier-to-noise ratio with the antenna estimated to have the highest carrier-to-noise ratio.

4. The diversity reception device according to claim 1, further comprising a correction value update/retention unit configured to retain a correction value table used for determination in interchanging the antenna, wherein:
the antenna interchange control unit refers to the correction value table retained by the correction value update/retention unit and estimates an antenna having a highest carrier-to-noise ratio among the connection-switched antennas on the basis of the input level measured by the level detection unit, and interchanges the antenna connected to the chain having the lowest carrier-to-noise ratio with the antenna estimated to have the highest carrier-to-noise ratio.

5. The diversity reception device according to claim 1, wherein:
before switching connection with the antenna connected to the chain having the lowest carrier-to-noise ratio to connection with antennas connectable to said chain, the demodulation circuit of said chain is disconnected from the diversity combining unit; and
after the antenna connected to the chain having the lowest carrier-to-noise ratio is interchanged with the antenna for which the estimated carrier-to-noise ratio is highest, the demodulation circuit of said chain is connected back to the diversity combining unit.

6. The diversity reception device according to claim 3, wherein the correction value update/retention unit calculates a correction value on the basis of the carrier-to-noise ratio of the demodulation unit before the antenna interchange and an input level ratio of the demodulation unit before and after the antenna interchange, and the carrier-to-noise ratio of the demodulation unit after the antenna interchange, and updates the correction value table by a determined update method.

7. The diversity reception device according to claim 3, wherein the determined short interval is inversely proportional to a moving speed of the diversity reception device and corresponds to a moving distance of the diversity reception device.

8. The diversity reception device according to claim 3, wherein the determined short interval is a constant time interval.

9. The diversity reception device according to claim 4, wherein:
after the antenna interchange control unit interchanges the antenna connected to the chain having the lowest carrier-to-noise ratio with the antenna estimated to have the highest carrier-to-noise ratio, the correction value update/retention unit updates the correction value table using the carrier-to-noise ratio being measured by the demodulation circuit of the chain that is connected to the interchanged antenna.

10. The diversity reception device according to claim 6, wherein the correction value update/retention unit updates the correction value table on the basis of a calculation result for a determined number of times in the past corresponding to an antenna combination before and after the antenna interchange, as the determined update method.

11. The diversity reception device according to claim 6, wherein the correction value update/retention unit updates the correction value table by performing averaging with weighting on a result close to the current time on the basis of a calculation result in the past corresponding to an antenna combination before and after the antenna interchange, as the determined update method.

12. The diversity reception device according to claim 6, wherein the correction value update/retention unit updates the correction value table on the basis of an immediately previous calculation result corresponding to an antenna combination before and after the antenna interchange, as the determined update method.

13. The diversity reception device according to claim 6, wherein the correction value update/retention unit updates the correction value table by using a property that a result of an inverse is obtained when the antenna combinations before and after the antenna interchange are opposites, as the determined update method.

14. The diversity reception device according to claim 6, wherein the correction value update/retention unit reduces a storage capacity for the correction value table by using a property that a result of an inverse is obtained when the antenna combinations before and after the antenna interchange are opposites.

15. The diversity reception device according to claim 6, wherein the correction value update/retention unit uses an initial value of 1 for the correction value in the correction value table.

16. The diversity reception device according to claim 6, wherein the correction value update/retention unit returns to an initial value the correction value at a time when a determined time period elapses from last update.

17. The diversity reception device according to claim 3, wherein
the diversity combining unit includes a main diversity combining unit and a sub diversity combining unit,
the diversity reception device further comprises:
a main/sub system selection unit configured to select whether to add a chain to the main diversity combining unit or the sub diversity combining unit; and
a channel control unit configured to control a reception channel of the tuner unit of each chain, and
when adding a chain to the sub diversity combining unit, the antenna interchange control unit compares the carrier-to-noise ratio of the demodulation unit of each chain over a determined short interval by a determined method, operates the main/sub system selection unit to add a chain having a lowest carrier-to-noise ratio to the sub diversity combining unit, and is changed to a determined reception channel by the channel control unit.

18. A diversity reception device comprising:
a plurality of antennas configured to receive digital broadcast waves;
an antenna switching unit configured to select and switch to a determined plural number of antennas out of the plurality of antennas;
a determined plural number of tuner units and a determined plural number of demodulation units, each of the tuner units and demodulation units corresponding to each of antennas selected by the antenna switching unit, configured to receive respective input of received signals of the selected antennas;
a diversity combining unit configured to perform diversity combining on outputs of the determined plural number of demodulation units as outputs of plural chains; and
an antenna interchange control unit configured to control the antenna switching unit to interchange an antenna; wherein
each of the demodulation units includes a demodulation circuit configured to measure a carrier-to-noise ratio of its received signal in the process of demodulating and a level detection unit configured to measure an input level of its received signal,
each of the tuner units includes a gain control unit configured to control gain in its received signal,
the antenna interchange control unit compares the carrier-to-noise ratio measured by the demodulation circuit of each chain among the plural chains and controls the antenna switching unit to sequentially switch connection with an antenna connected to a chain having a lowest carrier-to-noise ratio to connection with antennas connectable to said chain, during the diversity combining,
the level detection unit measures the input level for each of the connection-switched antennas, in the state where each connection-switched antenna is connected to the chain having the lowest carrier-to-noise ratio, and
the antenna interchange control unit
obtains, on the basis of the measured input level, a difference in input level between before and after the switching of the connection with the antenna connected to the chain having the lowest carrier-to-noise ratio for each of the connection-switched antennas, and estimates the carrier-to-noise ratio on the basis of the obtained difference in input level, and
interchanges the antenna connected to the chain having the lowest carrier-to-noise ratio with an antenna for which the estimated carrier-to-noise ratio is highest.

19. A diversity reception device comprising:
a plurality of antennas configured to receive digital broadcast waves;
an antenna switching unit configured to select and switch to a determined plural number of antennas out of the plurality of antennas;
a determined plural number of tuner units and a determined plural number of demodulation units, each of the tuner units and demodulation units corresponding to each of antennas selected by the antenna switching unit, configured to receive respective input of received signals of the selected antennas;
a diversity combining unit configured to perform diversity combining on outputs of the determined plural number of demodulation units as outputs of plural chains; and
an antenna interchange control unit configured to control the antenna switching unit to interchange an antenna; wherein each of the demodulation units includes a demodulation circuit configured to measure a carrier-to-noise ratio of its received signal in the process of demodulating and a level detection unit configured to measure an input level of its received signal, each of the tuner units includes a gain control unit configured to control gain in its received signal, the antenna interchange control unit compares the carrier-to-noise ratio measured by the demodulation circuit of each chain among the plural chains and controls the antenna switching unit to sequentially switch connection with an antenna connected to a chain having a lowest carrier-to-noise ratio to connection with antennas connectable to said chain, during the diversity combining, the level detection unit measures the input level for each of the connection-switched antennas, in the state where each connection-switched antenna is connected to the chain having the lowest carrier-to-noise ratio, and the antenna interchange control unit interchanges the antenna connected to the chain having the lowest carrier-to-noise ratio with an antenna having a highest input level measured by the level detection unit among the connection-switched antennas.

* * * * *